(12) United States Patent
Lee et al.

(10) Patent No.: US 8,031,267 B2
(45) Date of Patent: Oct. 4, 2011

(54) MOTION ADAPTIVE UPSAMPLING OF CHROMA VIDEO SIGNALS

(75) Inventors: Sang-hee Lee, Santa Clara, CA (US); Yi-jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1120 days.

(21) Appl. No.: 11/705,721

(22) Filed: Feb. 12, 2007

(65) Prior Publication Data

US 2008/0192145 A1 Aug. 14, 2008

(51) Int. Cl.
*H04N 11/20* (2006.01)
(52) U.S. Cl. .................... 348/453; 348/450; 348/451
(58) Field of Classification Search .................. 348/441, 348/448, 446, 450–453, 458, 459, 444; H04N 7/01, H04N 11/20
See application file for complete search history.

(56) References Cited

U.S. PATENT DOCUMENTS

| | | | |
|---|---|---|---|
| 5,771,074 A | 6/1998 | Ibenthal | |
| 5,936,676 A | 8/1999 | Ledinh | |
| 6,088,062 A | 7/2000 | Kanou | |
| 6,459,454 B1 | 10/2002 | Walters | |
| 2004/0125231 A1 | 7/2004 | Song et al. | |
| 2004/0257467 A1 | 12/2004 | Nicolas | |
| 2005/0179814 A1* | 8/2005 | Pau et al. | 348/448 |
| 2008/0117330 A1* | 5/2008 | Winger et al. | 348/448 |

FOREIGN PATENT DOCUMENTS

JP 2006-148367 A2 6/2006

OTHER PUBLICATIONS

Gerard De Haan, Erwin B. Bellers, "Deinterlacing—An Overview", Proceedings of the IEEE, vol. 86. No. 9, Sep. 1998, 10pages.
PCT Search Report, PCT/US2008/052504, Date mailed Jun. 24, 2008, International Filing Date Jan. 30, 2008, Applicant-Intel Corporation.
EP Search Report, EP/08728591, Date mailed Jun. 24, 2010, Application Patent No. 08728591.2 / 2119246, Date of completed Search Jun. 11, 2010, Applicant Intel Corporation.

* cited by examiner

*Primary Examiner* — Sherrie Hsia
(74) *Attorney, Agent, or Firm* — Blakely, Sokoloff, Taylor & Zafman LLP

(57) ABSTRACT

Upsampling for video signals is described. In particular chroma pixels may be upsampled in a luminance, chrominance signal using motion adaptive approaches. In one example, the operations include selecting an absent chroma pixel of the current frame, developing a spatial candidate value for the absent chroma pixel using pixel values for nearby pixels in the current frame, developing a temporal candidate value for the absent chroma pixel using pixel values for nearby pixels in the previous and subsequent frames, computing a value for the absent chroma pixel by combining the spatial candidate value and the temporal candidate value, and producing an output video frame including the computed absent chroma pixel values.

19 Claims, 4 Drawing Sheets

MOTION ADAPTIVE UPSAMPLING OF CHROMA VIDEO SIGNALS

BACKGROUND

1. Field

The present description is related to the field of video processing and in particular to upsampling chroma signals to produce higher resolution or progressive frames in video signals.

2. Related Art

Video signals may be composed of luma (Y) and two chroma (Cb, Cr) signals. The luma signal represents illumination or brightness and the chroma signals represent color aspects of the signals. These signals may be in any of a variety of different sampling formats. 4:4:4 YCbCr is used to designate a format in which the three video components, Y, Cb, Cr, have the same sampling rate. Since human perception of brightness (the luma aspect) is more sensitive than perception of colors (the chroma aspect), the chroma portion of the signal is often subsampled to reduce the amount of bandwidth needed to process the signal and to store it. 4:2:2 is a popular format used in many professional video cameras and storage devices and indicates that the two chroma components are sampled at half the rate, horizontally, of the luma component. 4:1:1 subsamples chroma information at one quarter the rate, horizontally, of the luma information and is commonly used in professional portable video news cameras.

4:2:0 YCbCr is commonly used in broadcast video, DVDs (Digital Video Disks) and other popular entertainment devices. It is supported by most MPEG (Motion Picture Experts Group) compression formats as well as many other formats. In 4:2:0 video, the Cb and Cr components are both subsampled at half the rate of the luma, both vertically and horizontally.

Chroma upsampling may be used in the field of video processing to convert video from, for example, 4:2:0 to 4:2:2, or higher resolution. This may be done to accommodate a particular type of display, to allow different video sources to be combined into a single program, or to improve the quality of the final displayed video imagery. Since 4:2:0 video has one half of the vertical chroma resolution of 4:2:2 video, spatial vertical filtering is typically used to fill in the additional chroma pixels. If the original signal is interlaced, then deinterlacing might be used to get the final progressive frames.

Chroma upsampling becomes difficult in the context of deinterlacers which interpolate video from an interlaced format e.g. 480i or 1080i to a progressive format e.g. 480p or 1080p. Conventional chroma upsampling methods apply simple linear filtering techniques to interpolate missing pixels in a single video frame from reference pixels in the spatial neighborhood in the same frame. In other words, the value of a chroma pixel is derived from the values of the pixels that are next to it or nearby. Some advanced chroma upsampling techniques consider local content information to adapt the weighting used for local filtering to improve the picture quality. However, these spatial techniques that rely on the spatial neighborhood ignore temporal information which is often a significant aspect of video signals.

BRIEF DESCRIPTION OF THE DRAWINGS

The invention may be more fully appreciated in connection with the following detailed description taken in conjunction with the accompanying drawings, in which like reference numerals refer to corresponding parts throughout the several views of the drawings, and in which.

DETAILED DESCRIPTION

Introduction

Motion adaptive techniques may be used to capitalize on the temporal information in a video signal. The temporal information may be used in an interpolation process to further improve picture quality. Spatial and temporal information may be used by first applying motion detection processing to assess the amount of motion or movement in a picture area, and second applying spatial edge detection to estimate the local complexity. These two aspects may be combined to achieve accurate interpolation of chroma upsampling. A video signal may be classified into visually static and visually moving regions and intra-field or inter-field interpolation may be adaptively applied to produce superior video quality Motion information may be used to eliminate the chroma quality loss that appears in other approaches in order to achieve a superior quality picture. Luma edge direction information may also be used in chroma upsampling for still better results.

The present description is applied to the example of converting the chroma fields of 4:2:0 interlaced video into the chroma fields of 4:2:2 progressive video frames, however embodiments of the present invention may be used in a wide range of other chroma upsampling applications. Since 4:2:0 video has one half of the vertical chroma resolution of 4:2:2 video, many conventional methods perform spatial vertical filtering to get 4:2:2 video from 4:2:0 video, and then apply de-interlacing to get the final progressive frames. However, the spatial vertical filtering of the first step typically causes not just a loss in vertical resolution but also feathering artifacts.

In the present example, a two step approach may be used. Both steps may be described as motion adaptive vertical temporal and spatial. Each step may use motion detection information together with spatial information to determine the best way to estimate the missing pixels. The two stages are suggested in FIG. 1. At block 102, the pixel data for the current video frame, the previous video frame and the subsequent video frame are fetched. At block 104, the first stage in the upsampling process is applied. In the example described herein, motion adaptive vertical upsampling is applied to the pixels of the current frame, considering the previous and subsequent frames. Temporal motion detection information at the first stage eliminates the quality degradations. This stage provides the missing vertical chroma resolution of some video compression schemes. For example, this stage converts 4:2:0 video to 4:2:2 video.

Figure 1:
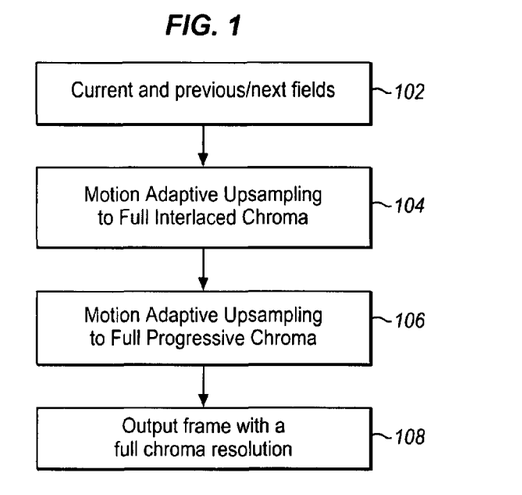
FIG. 1 is a process flow diagram for chroma vertical upsampling of interlaced video according to an embodiment of the invention.

At block 106, the second stage is applied. In the present example, motion adaptive vertical upsampling is applied using original data and data from the first stage for the current video frame. As in the first stage, luma edge direction information, for example, may be used to generate corresponding chroma pixels. The second stage fills in the pixels necessary to take the video from interlaced to progressive scan. Finally, at block 108, a progressive frame is generated that includes the full vertical resolution for chroma.

Figure 2:
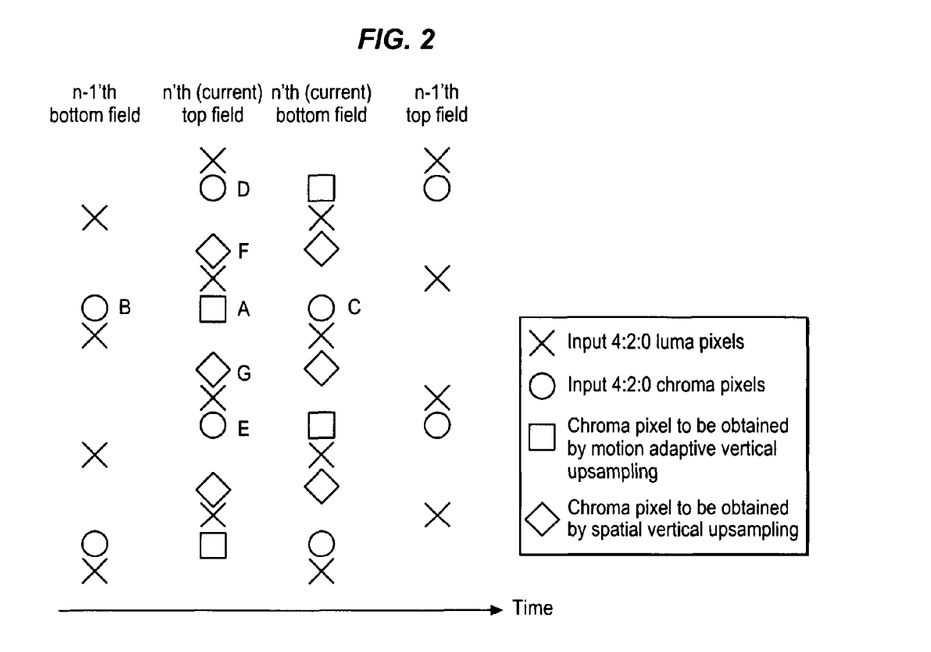
FIG. 2 is a diagram of luma and chroma pixels in successive fields of interlaced 4:2:0 video showing pixels that may be computed according to an embodiment of the invention.

FIG. 2 shows a sampling structure (X's and O's) for a 4:2:0 video signal and the chroma pixels to be computed (squares and diamonds) in order to make a conversion to 4:2:2. In FIG. 2, time progresses from left to right and each row shows a horizontal raster line. Typically there are hundreds of lines. Only a few are shown in order to simplify the drawing. The first or left column corresponds to the bottom field of the previous frame. The second column corresponds to the top field of the current frame. The third column corresponds to the bottom field of the current frame, and the fourth or right column corresponds to the top field of the next frame. In interlaced video, the top field typically corresponds to the odd-numbered raster lines, or pixel rows 1, 3, 5, 7, etc., while the bottom field typically corresponds to the even numbered raster lines or pixel rows 2, 4, 6, 8, etc. However, the bottom field may precede the top field and the corresponding lines may be reversed. Other types of interlacing may be used for other types of video encoding or compression and the principles of the present invention may be applied to those as well.

As shown in FIG. 2, the current frame, in the illustrated portion, has four rows of luma pixels in both the top and bottom fields. These are shown as X's in FIG. 2. This applies as well to the previous (column 1) and the next (column 4) frames. The chroma pixels, shown as O's are only available in every other row. The top field supplies rows 1 and 3 (pixels D and E), while the bottom field supplies rows 2 and 4 (pixels B and C) in a typical 4:2:0 YCrCb interlaced fashion.

For the sake of simplicity, this description will focus on pixels A, B, C, D, E, F, and G. It will be assumed that the current field is the top field. In other words, the generation of pixels A, F, and G is described. However; the same approach may be used for the bottom field. In the following examples, the top field is considered first. The same approach may also be applied to the bottom field. The bottom field may be considered first instead of the top field, or a more complex ordering of top and bottom fields may be applied as may be appropriate to a particular situation. In addition, the process may be applied to the Cr component, the Cb component or both. The same approach may be adapted for a variety of other color spaces as well. In this description, the term "line A," for example, is used to refer to a raster line which contains the pixel A.

First Stage

Motion adaptive vertical upsampling may be used to compute the pixel A in FIG. 2. This will make the vertical resolution of the chroma portion of the video equal to that of the luma portion of the video. In the illustrated example, there is no value for pixel A in the current frame of the video signal, however, there is a value for pixel A (that is a different pixel in the same location) in the previous field, pixel B, and in the next field, pixel C. Also, there are pixels in the spatially adjacent lines D and E in the current frame. Pixel D is in the line above pixel A and pixel E is in the line below pixel E (lines D and E, respectively). These spatially and temporally adjacent pixels and lines may be used to generate the pixel A. Weights to be applied to these values in determining pixel A may be determined by the amount of motion in the video.

Figure 3:
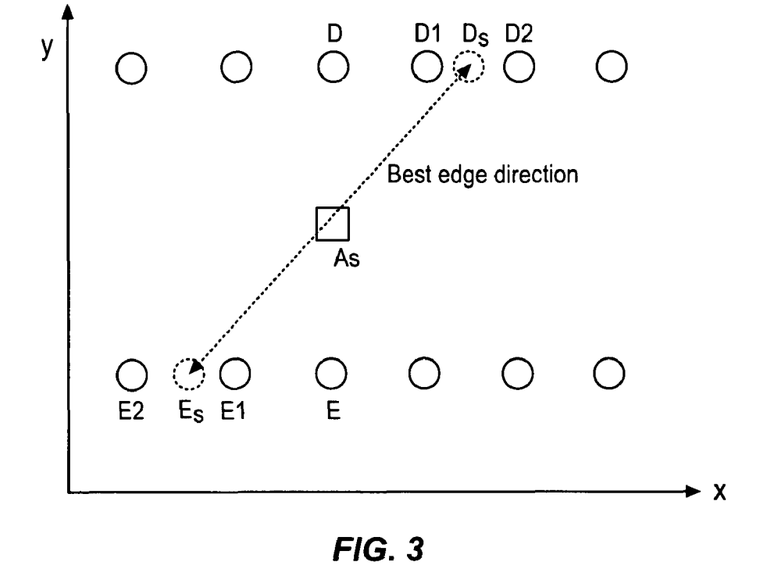
FIG. 3 is a diagram of luma and chroma pixels in a single frame of interlaced video to show an approach to spatial vertical upsampling using best edge direction according to an embodiment of the invention.

In the two upsampling operations of FIG. 1 indicated by block 104, two candidate values for pixel A may be developed. The temporal candidate, or temporal predictor, is generated based on temporal factors and is designated $A_t$. The spatial candidate or spatial predictor is designated as $A_s$, $A_t$, designated as the upsampling candidate from the temporal domain, may be computed from the temporally or time adjacent pixels B and C. There are at least three possible options to compute $A_t$:

1) $A_t$=average of pixels B and C.
2) $A_t$=B
3) $A_t$=C $A_s$ may be computed based on the spatially adjacent pixels D and E by at least one of the following options:

4) $A_s$=average of pixels D and E (see FIG. 2.)
5) $A_s$=average of pixel $D_s$ and $E_s$ (see FIG. 3.)

Pixels D and E are shown in FIG. 2 as the pixels immediately above and below pixel A, respectively, in the top field of the current frame. These are the corresponding chroma pixels for the same chroma component as pixel A, for example either for Cr or Cb. Pixels $D_s$ and $E_s$ are shown in FIG. 3 based on edge direction determinations. Any of a variety of different edge direction algorithms may be used depending on the particular application. Equation 4 or 5 will be selected based on the result of the edge detections.

FIG. 3 shows the relationship between $D_s$, D1 and D2 and between $E_s$, E1 and E2. The diagram is a spatial diagram of a portion of the top field of the current-frame showing an array of pixels in the horizontal, x, and vertical, y, axes. The FIG. 3 diagram corresponds to the middle two columns of FIG. 2, a combination of the top and the bottom fields. There are three raster lines along the three rows of the diagram. Line D is the top line and contains pixel D, immediately above where pixel $A_s$ is to be located. Pixels D1 and D2 are the next two chroma pixels to the right of pixel D. Line A is the line below Line D and is the line in which the computed pixel $A_s$ will be inserted. Line E is the bottom line and contains the pixel E, immediately below pixel $A_s$. Pixels E1 and E2 are the next two pixels to the left of pixel E. In the frame of FIG. 3, edge directions are first determined and the best edge direction is selected. Given the best edge direction, $D_s$, may be obtained by bilinear filtering using the left and right chroma pixels which are D1 and D2 respectively. Similarly, $E_s$ may be obtained by bilinear filtering of pixels E1 and E2. The best edge direction is determined in this example by the direction between $D_s$ and $E_s$. FIG. 3 is provided to show one example of a best edge direction determination using the neighboring chroma lines D and E. However any of a variety of other edge direction determination techniques may be used instead.

Figure 4:
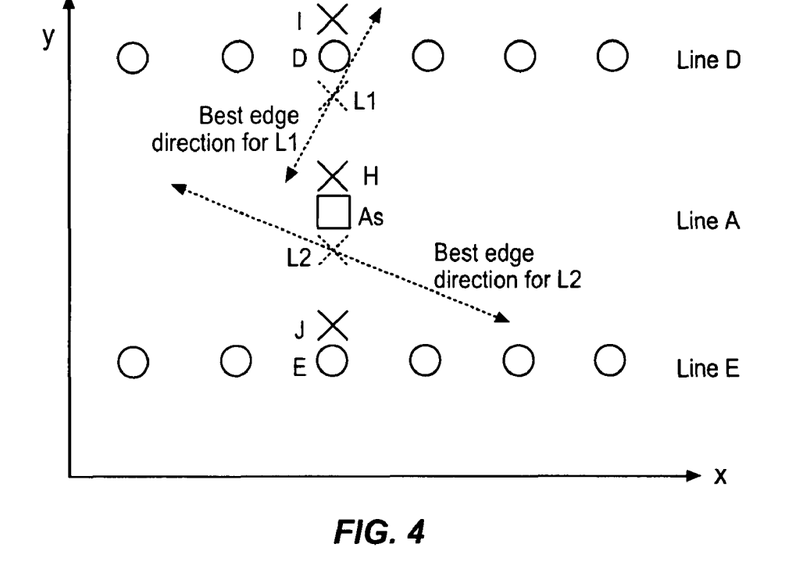
FIG. 4 is a diagram of luma and chroma pixels in a single frame of interlaced video to show an approach to determining best edge directions of neighboring luma pixels according to an embodiment of the invention.

A second approach to a best edge determination is shown in FIG. 4. Instead of chroma lines, this approach uses the luma (Y) pixel lines' best edge directions. In many video formats including 4:2:0 there are many more luma pixels, including pixels in the same position as the pixel A to be calculated. In addition, the luma pixels may already be computed in order to deinterlace the vertically closest two luma pixels. In FIG. 4, rows D, A, and E are also shown. Chroma pixel D has a closest luma pixel I. Chroma pixel A has a closest luma pixel H and chroma pixel E has a closest luma pixel J.

In FIG. 4, the two vertically closest luma pixels are diagrammed as pixels L1 and L2 in FIG. 4, described below. These pixels are typically already computed in another unrelated process in order to deinterlace the video. So in this case, L2 is in the closest position to pixel A and L1 is in the immediately adjacent row. The proximity of the two pixels provides a more precise edge direction determination. Any one of a variety of different methods may be used to compute the best edge direction using the neighboring two luma lines. As an alternative, the best angle of a single luma pixel may be used, for example the closest luma pixel, L1. This is computationally simpler. Other approaches to determining the best angle direction may also be used.

Given the one, two, or more best directions for the luma pixels, the best direction for the chroma pixels can be derived. One approach to derive a chroma direction from a luma direction is to analyze the difference between the direction of L1 and the direction of L2. If the difference between the two directions is larger than a certain threshold, then the best direction may be taken as the average of the two directions as suggested in equation 5, above. Otherwise, $A_s$ may be obtained as in equation 4 above (average of D and E). On the other hand, if the difference between the two directions is smaller than a certain threshold, then the best direction may be taken as the direction that is closest to 90 degrees (the vertical direction), that is either $D_s$ or $E_s$. Otherwise, $A_s$ may be obtained as in equation (4) above.

Finally, in the motion adaptive vertical upsampling stage, the output pixel A may be computed by a weighted combination of $A_t$ and $A_s$. This may be done, for example using the formulation below:

6) if ($\alpha>1$), then Pixel A=$A_s$
7) if ($\alpha<0$), then Pixel A=$A_t$
8) if ($\alpha>0$ and $\alpha<1$), then Pixel A=$\alpha A_s$+$(1-\alpha) A_t$ where $\alpha$ is a mix factor determined by the motion detection value (MD) of the current chroma pixel or the closest luma pixel. $\alpha$ may be determined, for example by one of the following relations:

10) $\alpha$=c1*MD+c2, where c1 and c2 are constants. In this case, $\alpha$ is linearly related to MD.

11) $\alpha$=1, if MD>c3, and otherwise $\alpha$=0, where c3 is a constant. In this case, $\alpha$ is a step function. The mix factor provides good results and may be quickly determined based on MD values that may have already been determined for other video processing operations. However, other factors may be used to weight the combination of Eq. 8. Other and more complex step functions may also be used. Any of a variety of different methods may be used for motion detection. The mix factor may also be determined based on attributes of the video other than motion detection.

By using the average of pixels D and E to produce $A_t$ and by using the average of pixels D and E to produce $A_s$, excellent quality may be obtained with reasonable low computational complexity.

Second Stage

Once the motion adaptive vertical upsampling of Stage 1 is complete, the vertical resolution of the current chroma field has been made equal to that of the luma fields. This result may be used to output a full resolution interlaced scan video signal (e.g. 480i, 540i, 1080i). If progressive scan video is desired, The next stage is to generate the final chroma progressive frame with a full vertical resolution. This is the computation of pixels F and G shown in FIG. 2, given the neighboring lines D and A.

Pixel F may be computed by any one the following methods:

a) Pixel F is the average of the pixels D and A.
b) Pixel F is computed by using the best edge direction as shown in FIG. 3 or 4.
c) Pixel F is computed using a blending operation as was done at the first stage, Equations 6, 7, 8. In this case, the temporal predictor may be determined as in Equations 1, 2, and 3, and the spatial predictor of the blending operation may be determined as in Equations 4 and 5. Motion detection values may be determined using the luma pixel that is spatially closest to F.

The best edge direction may be determined in a variety of different ways. One way to compute the best edge direction is by using chroma lines D and A. Any of a variety of different processes may be used to compute the best edge direction using the neighboring two lines.

The best edge direction may alternatively be determined by using the luma best edge direction already computed for the vertically closest one luma pixel to be deinterlaced, which is the pixel L1 in FIG. 4. Again, any of a variety of different approaches may be used to determine the best edge direction using the two neighboring. Using the edge directed interpolation from the luma prediction to produce the interpolated F provides a good tradeoff option to produce excellent quality with reasonable low complexity.

For pixel G, the same approach may be used relying on pixels E and A instead of pixels D and A. Pixels A, F, and G provide all of the missing chroma pixels in the area of the nth current top frame discussed above. Similar operations may be performed across an entire frame to provide all of the missing chroma pixels. These may then be combined to generate a full progressive scan frame from the original compressed interlaced video.

In the example of 4:2:0 video or 4:2:2 video and in any interlaced video, there are also missing luma pixels. These may be estimated using this or other approaches. The estimated luma pixels are then also used to produce the full resolution video frame. A variety of other operations may also be performed on the video signal before outputting the final video signal. Such operations may include contrast adjustments, motion effects correction, anti-aliasing, aspect ratio adjustments, frame rate compensation, overlaying with captions and titles, etc.

Upsampling System

Figure 5:
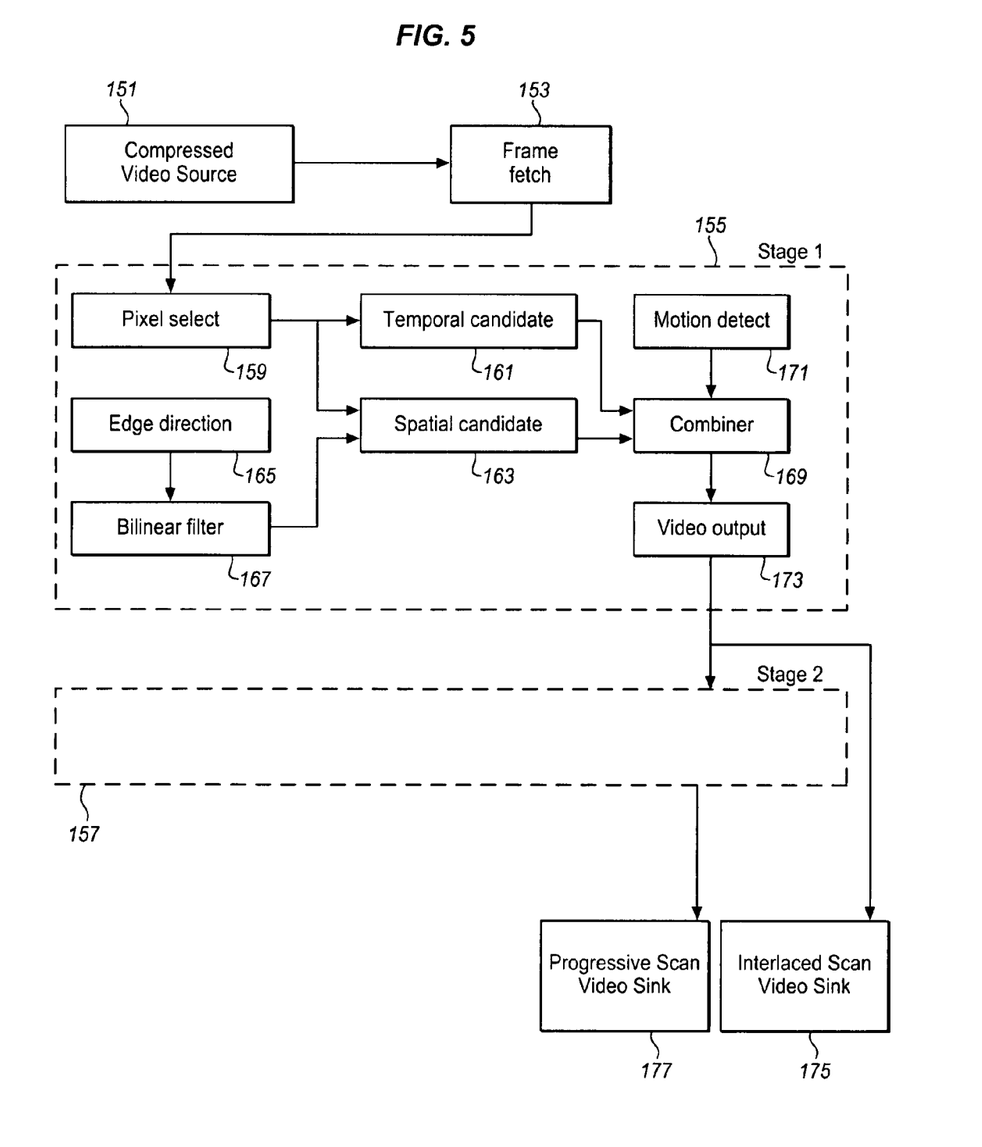
FIG. 5 is a diagram of a two-stage upsampling system according to an embodiment of the present invention.

FIG. 5 shows an upsampling system according to an embodiment of the present invention. In the example of FIG. 5, there is a compressed video source 151 that provides input to one or both stages 155, 157 of a two stage upsampling system to produce one of two different video outputs for video sinks. One sink is an interlaced video sink 175. The other is a progressive scan sink 175. Either sink may be a recording or storage device, a transmission system, such as a broadcasting station, antenna or Internet server or the sink may be part of an editing system. Either sink may also be used as a display. Interlaced video is frequently used for broadcast and display on phosphor based video displays. Progressive scan video is frequently used for liquid crystal, light emitting diode, and plasma displays as well as for editing and some disk formats.

As shown in FIG. 5, the compressed video source is coupled to a frame fetch 153. The frame fetch acquires video from the source for use by the upsampling system. FIG. 2 shows an example of a portion of the type of video that may be captured by the frame fetch. The frame fetch may act in response to the upsampling stages and may include buffers to allow acquired video to be provided to the upsampling stages on demand.

The frame fetch supplies video data to a pixel select 159 in Stage 1 155 that selects the pixels to be upsampled and the pixels to be used for the upsampling. The pixel select is coupled to a temporal candidate 161 and to a spatial candidate 163. The temporal candidate develops a temporal candidate pixel, e.g. $A_t$, while the spatial candidate develops a spatial pixel candidate, e.g. $A_s$. Stage 1 also has an edge direction 165 that is coupled to a bilinear filter 167 to provide a result to the spatial candidate 163. The temporal candidate and the spatial candidate are provided as inputs to a combiner 169. The combiner also receives an input from the motion detect 171, such as a mix factor. The combiner uses all of these inputs as described in the context of FIGS. 2, 3, and 4 to provide pixels not originally included in the video source 151. The pixels are provided to a video output 173.

As mentioned above, the result from video output 173 may be used as is, for example as an interlaced video signal. Alternatively, this may be an input to a Stage 2 157. Stage 2 may have a structure similar to Stage 1. This structure is not shown in order to simplify the drawing. A corresponding video output in Stage 2 (not shown) may then provide a progressive scan signal to an appropriate video sink 177.

The two stages are shown to illustrate a configuration that is consistent with the versions described above in the context of FIGS. 2, 3, and 4. More or fewer stages may be used, depending on the desired output format and depending on the input format. For example, if 4:1:1 video is used as an input, then more stages may be desired. On the other hand, if interlaced 4:4:4 video is supplied, then only one stage may be desired. Similarly, with 4:2:2 video as an input, if interlaced video is desired for the output, then only one stage may also be desired.

The apparatus of FIG. 5 may be implemented in a group of associated hardware devices, such as ASICs (Application Specific Integrated Circuit), DSPs (Digital Signal Processor), controllers, or other hardware devices. Alternatively, the blocks in FIG. 5 may correspond to different areas of a single integrated circuit. For many applications in which, for example, video is to be provided in real time, specific dedicated hardware may be desired. As another alternative, the block may be implemented as software modules that are executed by a general purpose machine.

Example Hardware

Figure 6:
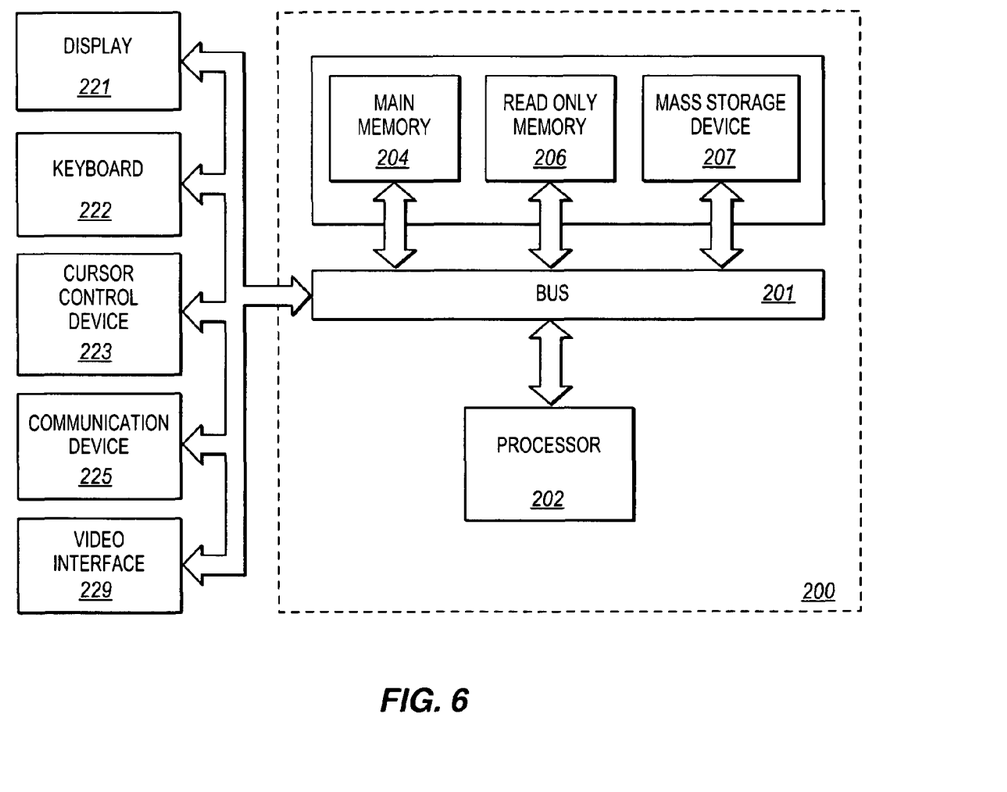
FIG. 6 is a diagram of a computer system suitable for implementing embodiments of the present invention.

A computer system 200 representing an example of a system upon which features of the present invention may be implemented is shown in FIG. 6. The chroma upsampling may be performed on this equipment and the resulting video may also be displayed. While a computer system is shown, video editing, video playback, disk players, game consoles, set-top boxes and other devices may take a similar form. This hardware configuration is shown as an example only and a variety of other configurations may be used instead. The computer system 200 includes a bus or other communication conduit 201 for communicating information, and a processing means such as a microprocessor, controller, or DSP (digital signal processor) 202 coupled with the bus 201 for processing information. The blocks of FIG. 5 may be implemented in this device, or in associated supporting chips (not shown). The supporting chips may be dedicated chips or dedicated portions of a controller or input/output hub, for example.

The computer system 200 further includes a main memory 204, such as a random access memory (RAM) or other dynamic data storage device, coupled to the bus 201 for storing information and instructions to be executed by the processor 202. The main memory also may be used for storing temporary variables or other intermediate information during execution of instructions by the processor. The main memory may be implemented as a separate device as shown or integrated with the processor in a single chip.

The computer system may also include a nonvolatile memory 206, such as a read only memory (ROM) or other static data storage device coupled to the bus for storing static information and instructions for the processor. A mass memory 207 such as a magnetic disk or optical disc and its corresponding drive may also be coupled to the bus of the computer system for storing information and instructions. The NVRAM and mass memory may also be incorporated into the processor as a single chip.

The computer system can also be coupled via the bus to a display device or monitor 221, such as a Liquid Crystal Display (LCD), for displaying information to a user. In addition to video, graphical and textual indications of installation status, operations status and other information may be presented to the user on the display device. Typically, an alphanumeric input device 222, such as a keyboard with alphanumeric, function and other keys, or a remote control may be coupled to the bus for communicating information and command selections to the processor. A cursor control input device 223, such as a mouse, a trackball, or cursor direction keys can be coupled to the bus for communicating direction information and command selections to the processor and to control cursor movement on the display 221.

A communication device 225 is also coupled to the bus 201. The communication device 225 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example. Further or alternative communication interfaces may be provided for other types of buses, such as USB (Universal Serial Bus), Firewire (i.Link or IEEE1394), or various wireless interfaces.

A video interface 229 is further coupled to the bus to supply video that is to be upsampled. This may be an input only so that the video may then be provided to the display 221, or it may be a two-way interface to allow the video to be provided to editing, transmission, or storage equipment. Alternatively, the upsampled video may be stored in the mass storage device. Editing and other operations may be performed on the upsampled video using the mass storage device and the processor depending on the application.

A lesser or more equipped computer system than the example described above may be preferred for certain implementations. Therefore, the configuration of the exemplary computer system 200 will vary from implementation to implementation depending upon numerous factors, such as price constraints, performance requirements, technological improvements, or other circumstances. The particular nature of any attached devices may be adapted to the intended use of the device. Any one or more of the devices, buses, or interconnects may be eliminated from this system and others may be added. For example, video may be provided on a PCI bus, on an AGP bus, through a PCI Express bus, through some other bus, or through an integrated graphics portion of the host controller or a processing core. It may be provided through a wired or wireless connector.

Other Considerations

While embodiments of the invention have been described in the context of converting the chroma (Cr, Cb) portion of interlaced 4:2:0 YCbCr interlaced scan video into 4:2:2 YCbCr progressive scan video, the approaches and techniques described here may be applied to a wide variety of different video resolutions and video conversion processes. The approaches and techniques here may also be applied to a wide range of other devices capable of communicating over a point-to-point interconnect bus. In addition, embodiments of the invention may be applied to professional or consumer equipment and to video as well as computer equipment.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in the Figures, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program an agent or a computer system to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of machine-readable media suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:
    fetching data for a current video frame, a previous video frame, and a subsequent video frame, each frame having rows and columns of pixels to form the frame, the fetched data including values for chroma pixels for each frame, at least some of the chroma pixels being absent from at least some of the rows and columns of the current frame;
    selecting an absent chroma pixel of the current frame;
    developing a spatial candidate value for the absent chroma pixel using pixel values for nearby pixels in the current frame;
    developing a temporal candidate value for the absent chroma pixel using pixel values for nearby pixels in the previous and subsequent frames;
    computing a value for the absent chroma pixel by combining the spatial candidate value and the temporal candidate value; and
    producing an output video frame including the computed absent chroma pixel values.

2. The method of claim 1, wherein developing a spatial candidate value comprises averaging the values for the chroma pixels that are vertically closest to the absent pixel.

3. The method of claim 2, wherein developing a spatial candidate pixel comprises determining an edge direction for nearby pixels in the same frame, applying bilinear filtering to obtain intermediate pixel values and combining the intermediate pixel values.

4. The method of claim 3, wherein the frames have luma pixels and wherein determining an edge direction comprises determining edge directions for nearby luma pixels.

5. The method of claim 1, wherein developing a temporal candidate comprises averaging the values for the chroma pixels in the same location as the absent pixel in the previous and subsequent frames, respectively.

6. The method of claim 1, wherein combining the spatial and temporal candidate values comprises assessing the amount of motion and weighting the spatial and temporal candidate values based on the assessment.

7. The method of claim 6, wherein assessing the amount of motion comprises applying motion detection.

8. The method of claim 1, further comprising computing values for additional absent chroma pixels and wherein producing an output video frame comprises including all of the computed values.

9. The method of claim 1, wherein fetching comprises fetching the current, previous, and subsequent video frames from a composite video signal with a vertically undersampled chroma component.

10. The method of claim 1, wherein fetching comprises fetching the current, previous, and subsequent video frames from an interlaced video signal and wherein producing an output video frame comprises producing a progressive scan video frame.

11. The method of claim 1, further comprising selecting a second absent chroma pixel of the current frame, developing a spatial candidate value for the second absent chroma pixel using, in part, the computed value for the first absent chroma pixel, and computing a value for the second absent chroma pixel based, in part on the developed spatial candidate value.

12. A machine-readable medium containing instructions that when operated on by the machine, cause the machine to perform operations comprising:
    fetching data for a current video frame, a previous video frame, and a subsequent video frame, each frame having rows and columns of pixels to form the frame, the fetched data including values for chroma pixels for each frame, at least some of the chroma pixels being absent from at least some of the rows and columns of the current frame;
    selecting an absent chroma pixel of the current frame;
    developing a spatial candidate value for the absent chroma pixel using pixel values for nearby pixels in the current frame;
    developing a temporal candidate value for the absent chroma pixel using pixel values for nearby pixels in the previous and subsequent frames;
    computing a value for the absent chroma pixel by combining the spatial candidate value and the temporal candidate value; and
    producing an output video frame including the computed absent chroma pixel values.

13. The medium of claim 12, wherein developing a spatial candidate value comprises averaging the values for the chroma pixels that are vertically closest to the absent pixel.

14. The medium of claim 13, wherein developing a spatial candidate pixel comprises determining an edge direction for nearby pixels in the same frame, applying bilinear filtering to obtain intermediate pixel values and combining the intermediate pixel values.

15. The medium of claim 14, wherein the frames have luma pixels and wherein determining an edge direction comprises determining edge directions for nearby luma pixels.

16. An apparatus comprising:
a data fetch coupled to a video source to fetch data for a current video frame, a previous video frame, and a subsequent video frame, each frame having rows and columns of pixels to form the frame, the fetched data including values for chroma pixels for each frame, at least some of the chroma pixels being absent from at least some of the rows and columns of the current frame;
a pixel select to select an absent chroma pixel of the current frame;
a spatial candidate to develop a spatial candidate value for the absent chroma pixel using pixel values for nearby pixels in the current frame;
a temporal candidate to develop a temporal candidate value for the absent chroma pixel using pixel values for nearby pixels in the previous and subsequent frames;
a combiner to compute a value for the absent chroma pixel by combining the spatial candidate value and the temporal candidate value; and
a video output to produce an output video frame including the computed absent chroma pixel values.

17. The apparatus of claim 16, further to compute values for additional absent chroma pixels and wherein the output video frame includes all of the computed values.

18. The apparatus of claim 16, wherein the data fetch fetches the current, previous, and subsequent video frames from a composite video signal with a vertically undersampled chroma component.

19. The apparatus of claim 16, wherein the data fetch fetches the current, previous, and subsequent video frames from an interlaced video signal and wherein the output video frame is a progressive scan video frame.

* * * * *